June 19, 1962  R. J. GAUVIN  3,040,116
BATTERY CHARGING SYSTEM FOR SUBMARINES
Filed Nov. 19, 1957  2 Sheets-Sheet 1
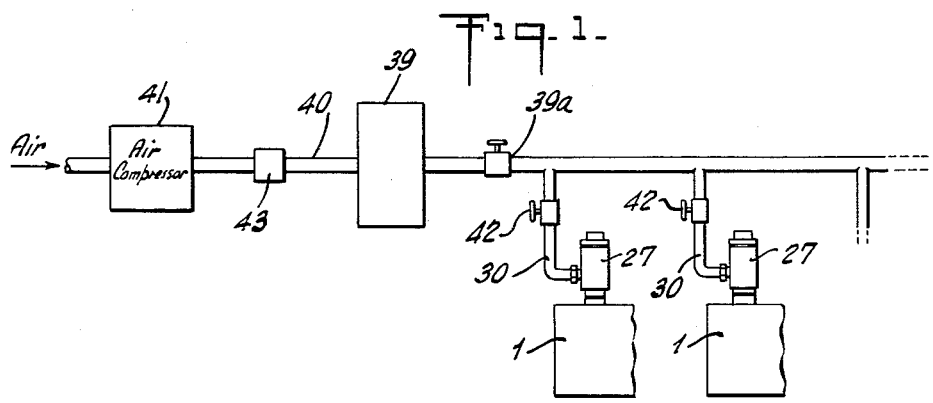
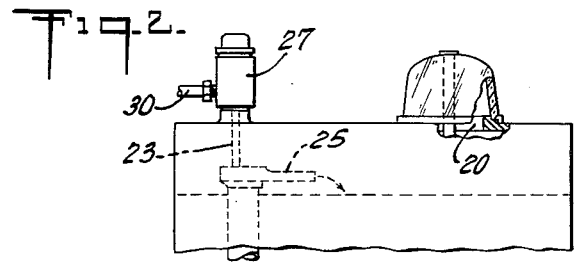
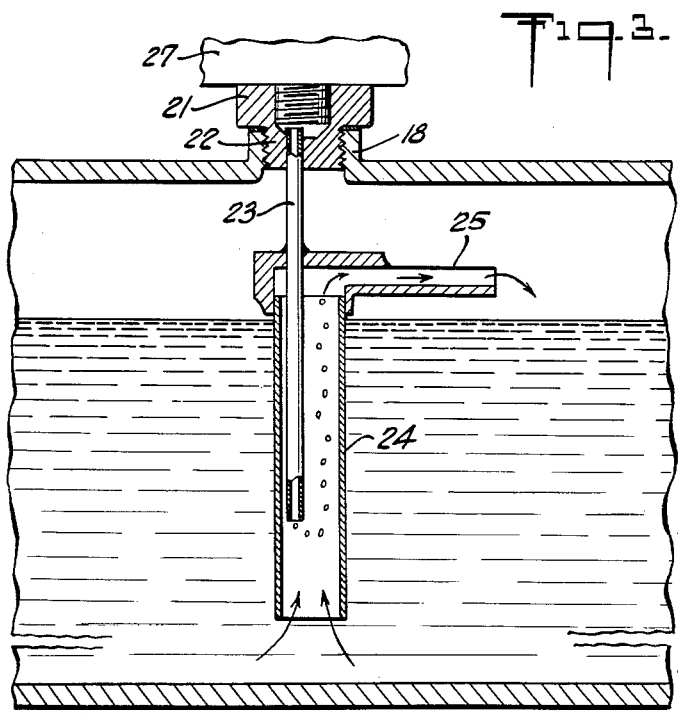
INVENTOR
ROLAND J. GAUVIN
BY *Lee J. Hunberger*
ATTORNEY 3,040,116
BATTERY CHARGING SYSTEM FOR
SUBMARINES
Roland J. Gauvin, Rochester, N.H., assignor to the United States of America as represented by the Secretary of the Navy
Filed Nov. 19, 1957, Ser. No. 697,593
1 Claim. (Cl. 136—160)
(Granted under Title 35, U.S. Code (1952), sec. 266)

The invention described herein may be manufactured and used by or for the Government of the United States of America for governmental purposes without the payment of any royalties thereon or therefor.

This invention relates to submarines and more particularly to means for locally agitating and recirculating the electrolyte in each battery while it is being charged.

An object of the invention is to provide an improved combination for use during charging of the batteries of a submarine, to locally agitate and recirculate the electrolyte in each battery, which will prevent discharge from each battery of any of its electrolyte when the charging is terminated, which will enable one to visually ascertain separately for each battery whether or not its electrolyte is being agitated and locally recirculated during charging, and which is relatively simple, practical, effective, convenient and inexpensive.

Other objects and advantages will be apparent from the following description of an embodiment of the invention, and the novel features will be particularly pointed out hereinafter in connection with the appended claim.

In the accompanying drawings:

FIG. 1 is a schematic diagram illustrating generally the application of the invention to the agitation and local recirculation of the electrolyte of the batteries of a submarine;

FIG. 2 is an elevation of the upper part of a storage battery modified in accordance with this invention;

FIG. 3 is a schematic diagram on a larger scale of the percolator mechanism of the same for agitating and locally recirculating the electrolyte in each battery that was shown generally in FIG. 2;

Figure 5:
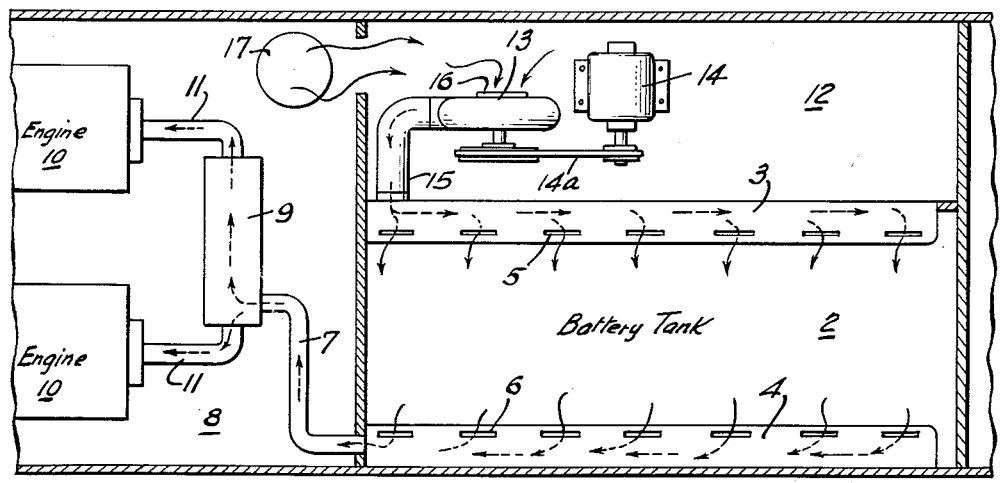
FIG. 5 is a schematic diagram representing a part of the interior of a submarine, and illustrating the means which causes variations in the atmospheric pressure within a battery during charging and afterward.

In the illustrated example of the invention, and referring first to FIGS. 1 and 5 of the drawing, in a submarine a plurality of storage batteries 1 (FIG. 1) are arranged side by side in a closed compartment or chamber 2 (FIG. 5) sometimes called a battery tank, having an air supply plenum chamber or header 3 extending along one side of the chamber 2 and an exhaust plenum chamber or header 4 extending the opposite side of the chamber 2. The headers 3 and 4 have slits or apertures 5 and 6 respectively, arranged along the same at intervals, through which apertures 5 air under pressure may pass from header 3 into chamber or tank 2, and through which apertures 6 air may be withdrawn from the chamber or tank 2. A pipe 7 connected to one end of the header 4, is disposed in another chamber 8, which is at atmospheric pressure, and is connected to a distributing header 9 in chamber 8. Internal combustion engines 10 in chamber 8 have their air intake pipes 11 connected to the distributing header 9.

In a room 12 that is open at all times to the chamber 8, a blower 13, that is operated by a motor 14 through a belt 14a, is connected at its delivery port by a pipe 15 to the air supply header 3. Its intake port 16 is open to the air in room 12. Air is supplied to chamber 8, and through it continuously to room 12, at approximately atmospheric pressure through an air inlet 17 that is open to atmosphere such as through the conning tower or snorkel passage, when the engines are running.

Referring next to FIG. 2, wherein only the upper portion of a battery is illustrated, each battery 1 has a closed and sealed top 18, but this top 18 has extending upwardly therefrom a porous, ceramic dome 17 over an aperture 20 in the top 18. This ceramic dome which opens into the chamber of the casing 1 through the opening 20, serves as a breather vent by which hydrogen gas that is liberated during charging of the battery escapes from the interior of the battery and through which air may escape after it has performed its function of locally agitating and recirculating the electrolyte of the battery in a manner which will be explained hereinafter.

Figure 4:
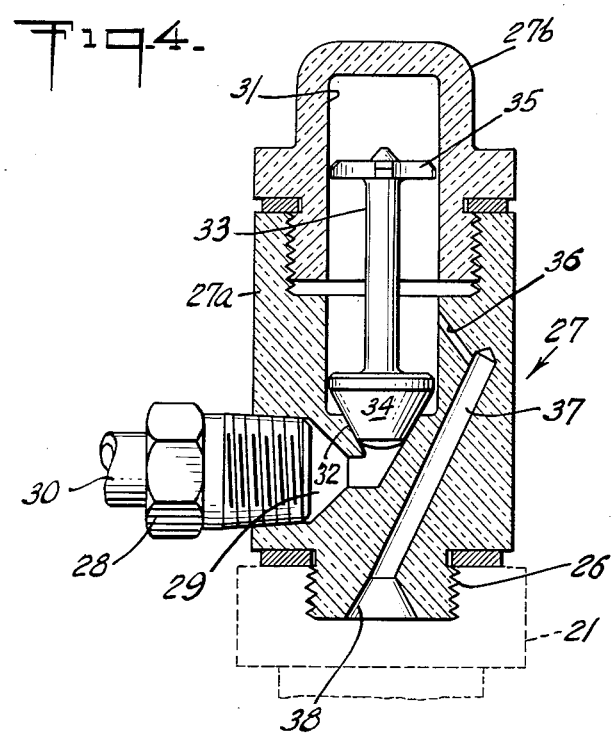
FIG. 4 is a sectional elevation of the check valve employed with the same.

Also provided in the top 18 of the battery is a cell cap 21 in the nature of a sleeve fitting in a passage 22 of the top 18. A pipe 23 is secured in the lower end of the passage of the sleeve or cell cap 21, and extends downwardly into the interior of the housing of the battery and into a tube 24 which is disposed upright in the battery to extend from the lower part of the battery, well above the bottom as shown in FIG. 3, to a level preferably to or above the maximum normal electrolyte level in the battery. This tube 24 (see FIG. 3) is open at its lower end, and its upper end terminates in a horizontal trough 25 that opens upwardly and at its free end. The pipe 23 extends downwardly into and along tube 24, and is much smaller than and does not fill the tube 24 in a transverse direction. Tube 23 extends downwardly to a point below the minimum expected electrolyte level, and is there open. Screwed into the upper end of the passage in cell cap 21 is a depending threaded stem 26 of the housing 27 of a check valve. An adaptor 28 (FIG. 4) is threaded into a port 29 in one side wall of housing 27 and is connected at its outer end to the pipe 30. The valve housing 27 is provided with a chamber 31 which at its lower end communicates with the port 29 through a tapered frusto-conical seat 32.

A valve element 33 is provided in the chamber 31 so as to reciprocate endwise of itself in that chamber, and at its lower end it carries a valve head 34 which is tapered or frusto-conical to fit the seat 32, so that the head 34 by seating in the seat 32 closes the port 29. The valve element 33 extends upwardly from the head 34 and at its upper end carries an indicator disk 35 which has a small clearance between its periphery and the wall of the chamber 31, so that there will be little or no friction between the disk 35 and the wall of the chamber 31. A second port 36 is provided in a side of the wall of the housing 27, at a point somewhat above the head 34 when the latter is resting in its seat 32, but which the head passes when lifted from its seat 32. This port 36, which opens into the chamber 31, is connected to a passage 37 that extends downwardly in the housing and at its lower end opens through the lower end face of the threaded stem 26 of the housing. This provides a passage from the chamber 31 of the check valve through the cell cap into tube 23.

The check valve housing is preferably made in two sections, 27a and 27b, which are threaded together end to end, with part of the chamber 31 in each section, the two parts of the chamber 31 being of the same cross-sectional size and aligned with and opening into one another. At least one wall of the housing 27 of the check valve is made of transparent material, in that portion of the valve in which the indicator disk 35 moves, so that the position of the indicator disk 35 at all times will be clearly visible through said transparent wall and one can ascertain visually whether or not the check valve is open or closed at any time. Preferably the entire housing 27 is made of transparent material, and while any suitable transparent material may be used for this purpose, I have found that transparent plastics, such as acrylic resins, particularly polymerized methylmethacrylate resins, are very suitable for this purpose since such plastics may be molded with the passages therein to a large extent, and which may be machined easily to provide passages which are not easily molded therein. Making the housing in separate sections which are screwed together, with a sealing gasket between shoulders of the two sections, facilitates the molding of the housing with passages and seats therein. Any other plastic resin that is transparent and resistant to acids, and which can be molded and machined may be used. Polymerized methyl methacrylate resin is sold in the open market under the trademark "Lucite."

Referring next to FIG. 1, the pipes 30 which are connected to the check valves are connected to a header unit or storage tank 39 which is, in turn, connected by pipe 40 to an air compressor 41. Each pipe 30 preferably contains a manually operable valve 42 therein so that the rate of flow of air through each check valve may be regulated individually for each battery when the air compressor is operating. Instead of operating the compressor 41 only when it is desired to deliver air to each of the batteries, the compressor could be operated to store air under pressure in the header unit 39, in which case the pipe 40 would have a check valve 43 therein and opening to pass air from the compressor to the header so that when the compressor stops, the compressed air may not return to the compressor from the storage tank 39. In such a case the main supply pipe from the header 39 would have therein a valve 39a so that when the charging of the batteries was discontinued, the valve 39a would be closed.

The operation of the apparatus will be briefly explained. In a submarine the batteries employed are of the lead-acid type, using an acid electrolyte. In charging the batteries some hydrogen gas is released into the closed tank room 2 in which the batteries are disposed, and this hydrogen is removed from the battery tank or room by air received in the engine room 8 through the inlet 17, and passing freely into the room 12 with which room 8 is in continual communication. Air from the room 12 is delivered under pressure by the blower 13 and pipe 15 into the air supply header 3 that extends along one wall of the closed room 2 in which the batteries are disposed. This air escapes from the header or chamber 3 through slits or apertures 5 arranged at intervals along the length of the header 3 and passes across the room 2 and enters the exhaust chamber or header 4 through the slits or apertures 6, and carries with it from room 2 any hydrogen gas that has been liberated during the charging and has escaped into the room. The header 4 is connected to the air intake ports of the engines, so that the air used for combustion in the engines 10 will be that drawn through the room 2 and carrying with it the liberated hydrogen gas. The hydrogen is thus burned in the engines and safely disposed of in that manner. Concentration of the hydrogen in the air which is drawn through the room 2 is small enough to avoid having an explosive mixture exteriorly of the engine. It will be understood, of course, that other fuel is used to operate the engines, since the amount of hydrogen liberated is inadequate in quantity to alone operate the engines, and the mixture of air and hydrogen as removed from room 2 in itself does not have sufficient hydrogen to constitute an explosive mixture. This makes it necessary to increase the amount of fuel in the air supplied to the engines in order to supply combustible mixtures for the engines.

The engines 10, of course, operate an electric generator (not shown) which is used to charge the batteries in the usual manner, and during the charging, the engines will of course be running and drawing air through the battery room 2. Since air is moved through the room 2 under suction leading to the engines, a small vacuum will be created in room 2 which will be communicated through the ceramic cap or breather vent to the interior of each battery, it being understood that the battery is always open to atmospheric pressure in room 2 through this breather vent. While air is delivered under pressure by the blower 13, this is insufficient to create in the room 2 a pressure higher than atmospheric pressure, because the suction of the engines creates a partial vacuum in the exhaust header 4 in an amount which more than offsets the small pressure created by the blower 13. The charging of the batteries occurs when the engines are operating such as when the submarine is surfaced, and during snorkeling, and during that time the atmospheric pressure in room 2 and in the interior of each battery will be less than the atmospheric pressure in rooms 8 and 12.

When the batteries have been charged, or if for any reason the charging is discontinued before the charging is completed which might happen for example if the submarine was to be quickly submerged, the intake 17 is closed, and the engines stopped. Since the room 12 was under normal atmospheric pressure and the room 2 was under a small vacuum, air will pass from room 12 to room 2 to equalize this pressure which results in a rise in pressure in the room 2. This rise in atmospheric pressure in room 2 is communicated through the ceramic vent caps to the interiors of the batteries. This temporary rise in atmospheric pressure in the interior of each battery tends to force the electrolyte of that battery outwardly through tube 23 and the check valve, but the check valve at once closes when air under pressure is no longer supplied thereto and prevents this discharge of electrolyte from each battery. This prevents any of the electrolyte from being forced outwardly through the check valves into the pipes 30 where corrosion might occur, and which might prevent the return of the electrolyte to the batteries.

During the charging of the batteries air under pressure is delivered through the pipes 30 and 23 to the tubes 24 in the various batteries, to points below the minimum level of the electrolyte in the batteries, and this air in leaving the open lower end of the pipe 23 will bubble upwardly in the tube 24 and cause an upward movement of the electrolyte in the tube 24 and its discharge through the trough 25 into the upper part of the interior of the battery, in the same manner that water is sucked up in a coffee percolator by the rising steam bubbles in a tube and discharged upon the coffee grounds in the upper part of the percolator. The relative sizes of the pipe 23 and tube 24 will be proportioned to provide this percolating action in the same manner that the percolating action is performed in the well-known coffee percolator. This continuous internal local agitation and recirculation of the electrolyte in each battery during the charges enables a fast charging of the batteries with more rapid release of hydrogen vapors. Heretofore when an air stream was bubbled through electrolyte to agitate it the only way that one could determine that the electrolyte in any battery was being agitated or percolated was to remove the ceramic cap of that battery and use a portable light to look into a battery, which often released an undesirable amount of hydrogen into the room 2 in which the batteries were arranged. This was a fire hazard because of the combustibility of the hydrogen, but the porous ceramic cap also acts as a fire barrier which will prevent fire flash backs through the caps into the batteries. It is now unnecessary to remove the ceramic caps because the position of the indicator disc 35 or of the valve element 33 of the check valve, which is visible through the transparent wall of the valve housing, enables one to ascertain visually at all times and without removal of the ceramic closure whether the agitating air is being discharged into the percolator part of the battery, yet when the charging is terminated, the check valve is closed at once and prevents loss of electrolyte by the suddenly increasing atmospheric pressure in the interior of the battery housing.

The agitation and local recirculation of the electrolyte in each battery by the air-caused percolation overcomes any stratification of the electrolyte where the denser or higher specific gravity electrolyte that is formed during the charging tends to remain at the bottom of the cell. Thus the charging time is reduced since stratification cannot occur, because each battery will receive its share of air to agitate the ionized solution during the charging.

Heretofore when the batteries were sufficiently charged or the charging was terminated as when diving, the changing air pressure in each battery tended to carry electrolyte backwardly into the air supply plastic hoses and pipes, and finally into the header. The electrolyte that was so discharged from the battery came in direct contact with metal fittings, some of which are of the corrosive type, and as a result rust and acid salts tended to accumulate in those fittings, reducing their efficiency and finally plugging them, which prevented agitating air from entering the batteries. This backward flow of the electrolyte has been known to affect the centrifugal pressure in that its vanes would rotate in the opposite direction, thus encouraging the movement of the electrolyte solution into the headers.

With this invention, during the 4 or 5 seconds it requires to equalize the pressure in the battery space following snorkeling or battery charging, the check valves prevent any discharge of electrolyte from each battery as the atmospheric pressure is equalized. The agitating air which is supplied under pressure to the batteries is under a relatively low pressure, but it builds up sufficiently to cause the check valve elements to lift and pass the air under such low pressure into the interior of each battery.

This application is a continuation-in-part of patent application Serial No. 500,712 filed April 11, 1955, for Check Valve Air Injection System by Roland J. Gauvin.

It will be understood that various changes in the details, materials and arrangement of parts, which have been herein described and illustrated in order to explain the nature of the invention, may be made by those skilled in the art within the principle and scope of the invention as expressed in the appended claim.

I claim:

In a system for agitating the electrolyte of a plurality of individual storage batteries in a submarine during their charging, where the atmospheric pressure within each battery increases when the charging stops due to equalization of the pressures within the batteries with the air pressure surrounding them, the combination of a battery tank room containing a plurality of such individual storage batteries each vented into said room, an engine having an intake manifold and operated during charging of the batteries, means including said intake manifold for passing air through said room to carry off hydrogen gas released from said batteries through their vents into said room during charging, of the batteries, burning the mixture of air and hydrogen in said engine, and creating a small vacuum in said room and through said room inside said batteries, means in each battery for locally circulating the electrolyte therein upon admission of a stream of compressed air into a laterally confined upright zone of the electrolyte of each battery, which zone terminates at an open, upper end adjacent the top of the electrolyte and discharges into said electrolyte, and opens at its lower end into the electrolyte well below the said upper surface portion means including a pipe connected to each of said local circulating means for supplying under pressure a stream of air to the electrolyte circulating means of each battery during charging of that battery, and having in its pipe a fully opening check valve that opens to pass air to the battery circulating means and closes automatically to prevent reverse passage of any electrolyte therethrough when charging of the batteries terminates, the suction of said engine stops, and the air pressure in said batteries increases by entry of outside air through the battery vent upon cessation of the vacuum therein which is created from the engine intake manifold.

References Cited in the file of this patent

UNITED STATES PATENTS

| | | |
|---|---|---|
| 1,034,157 | Sokal | July 30, 1912 |
| 1,106,719 | Lake | Aug. 11, 1914 |
| 1,572,403 | Mershon | Feb. 9, 1926 |
| 2,584,117 | Elrod | Feb. 5, 1952 |
| 2,676,560 | Thomas | Apr. 27, 1954 |

FOREIGN PATENTS

| | | |
|---|---|---|
| 308,996 | Germany | Dec. 1, 1917 |